(12) United States Patent
Thompson

(10) Patent No.: US 7,074,151 B2
(45) Date of Patent: Jul. 11, 2006

(54) DRIVE CONFIGURATION FOR A SKID STEERED VEHICLE

(75) Inventor: Robert W Thompson, Farnborough (GB)

(73) Assignee: QinetiQ Limited (GB)

( * ) Notice: Subject to any disclaimer, the term of this patent is extended or adjusted under 35 U.S.C. 154(b) by 62 days.

(21) Appl. No.: 10/474,349

(22) PCT Filed: Apr. 17, 2002

(86) PCT No.: PCT/GB02/01735

§ 371 (c)(1),
(2), (4) Date: Oct. 8, 2003

(87) PCT Pub. No.: WO02/083483

PCT Pub. Date: Oct. 24, 2002

(65) Prior Publication Data

US 2004/0116228 A1 Jun. 17, 2004

(30) Foreign Application Priority Data

Apr. 17, 2001 (GB) .................................. 0109336.8

(51) Int. Cl.
*B62D 11/06* (2006.01)
*B62D 11/02* (2006.01)
*B62D 11/00* (2006.01)
*F16H 37/02* (2006.01)

(52) U.S. Cl. ........................ 475/225; 475/205; 475/19; 180/6.5; 180/6.48; 180/6.28

(58) Field of Classification Search ................. 475/19, 475/28, 29, 201, 204, 205, 223, 224, 225, 475/230; 180/6.26–6.3, 6.38, 6.44, 6.48, 180/6.5, 6.62; 188/65.5
See application file for complete search history.

(56) References Cited

U.S. PATENT DOCUMENTS

| | | | | |
|---|---|---|---|---|
| 1,948,830 A | * | 2/1934 | Arthur et al. | 411/197 |
| 3,214,999 A | * | 11/1965 | Lapp | 74/665 D |
| 3,503,278 A | * | 3/1970 | Livezey | 74/661 |
| 3,986,412 A | * | 10/1976 | Farley | 74/661 |
| 4,497,218 A | * | 2/1985 | Zaunberger | 475/18 |
| 4,663,985 A | * | 5/1987 | Metcalf et al. | 74/661 |
| 4,848,186 A | * | 7/1989 | Dorgan et al. | 475/24 |
| 4,917,200 A | * | 4/1990 | Lucius | 180/6.2 |
| 4,997,412 A | * | 3/1991 | Reed | 475/24 |
| 4,998,591 A | * | 3/1991 | Zaunberger | 180/6.44 |

(Continued)

FOREIGN PATENT DOCUMENTS

DE 36 41 648 A 6/1988

(Continued)

*Primary Examiner*—Tisha Lewis
(74) *Attorney, Agent, or Firm*—McDonnell Boehnen Hulbert & Berghoff LLP

(57) ABSTRACT

An electric drive configuration for a skid steered vehicle comprises: a pair of propulsion motors (74a, 74b), each with a motor shaft protruding from both ends of the motor and mounted on the same axis across the vehicle, each being coupled at the outer end to drive one of a pair of tracks or set of wheels of the skid steered vehicle; a control differential steep gear unit (72) positioned between the two propulsion motors and in driveable communication with the inner ends of the two motor shafts: and a steer motor (71) in driveable communication with the controlled differential (72), the steer motor (71) being controllable from zero speed giving straight line running in which both motor shafts are coupled to run at the same speed, to a range of speeds in both directions of rotation giving steering capability in both directions.

21 Claims, 4 Drawing Sheets

U.S. PATENT DOCUMENTS

| | | | |
|---|---|---|---|
| 5,076,377 A | 12/1991 | Frazer | |
| 5,195,600 A * | 3/1993 | Dorgan | 180/9.1 |
| 5,265,682 A * | 11/1993 | Russell et al. | 175/45 |
| 5,509,491 A * | 4/1996 | Hall, III | 180/9.44 |
| 5,511,629 A * | 4/1996 | Vogel | 180/447 |
| 5,558,590 A | 9/1996 | Okada | |
| 5,722,501 A * | 3/1998 | Finch et al. | 180/6.44 |
| 5,851,162 A | 12/1998 | Tether | |
| 6,017,289 A | 1/2000 | Gaffney | |
| 6,039,132 A * | 3/2000 | Easton | 180/6.44 |
| 6,247,716 B1 * | 6/2001 | Sato et al. | 280/250.1 |
| 6,491,599 B1 * | 12/2002 | Schmidt | 475/5 |
| 6,499,549 B1 * | 12/2002 | Mizon et al. | 180/65.6 |
| 6,830,529 B1 * | 12/2004 | Phelan et al. | 475/221 |
| 2001/0017227 A1 * | 8/2001 | Amano et al. | 180/65.2 |

FOREIGN PATENT DOCUMENTS

| | | |
|---|---|---|
| GB | 2348253 | 9/2000 |

\* cited by examiner

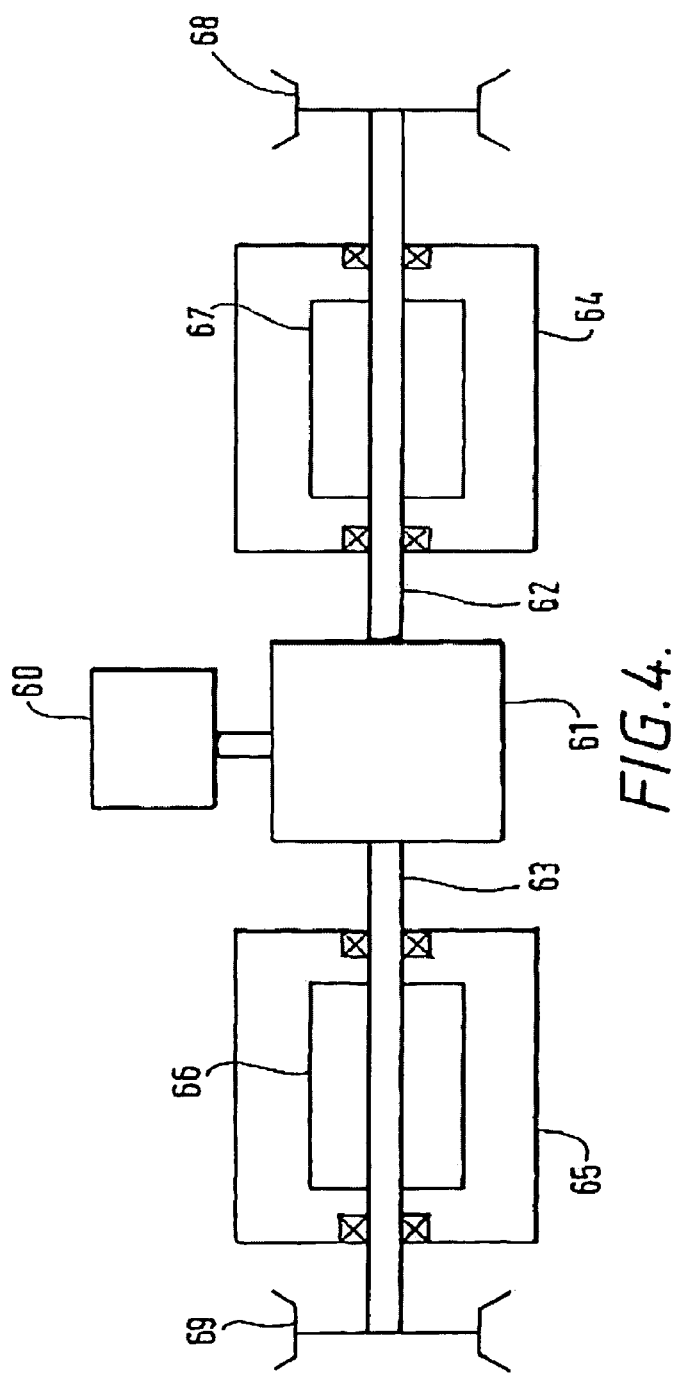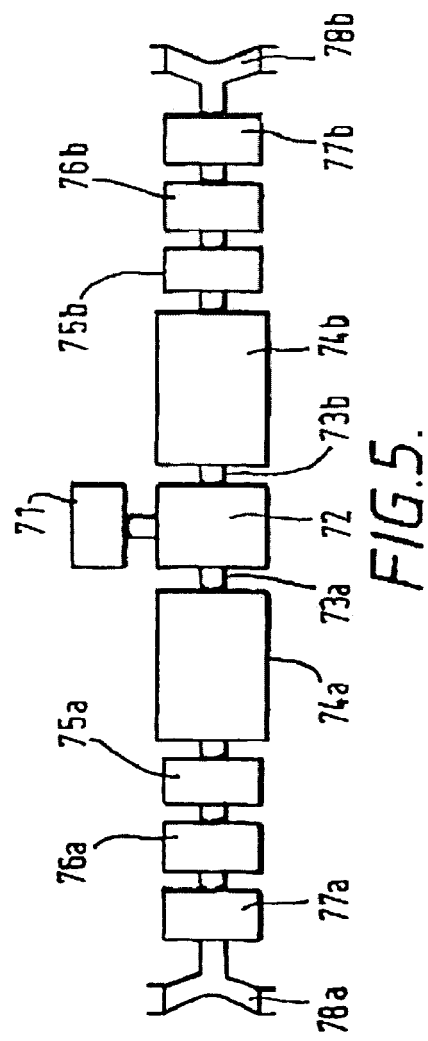

DRIVE CONFIGURATION FOR A SKID STEERED VEHICLE

This application is the US national phase of international application PCT/GB02/01735, filed 17 Apr. 2002, which designated the US. PCT/GB02/01735 claims priority to GB Application No. 0109336.8, filed 17 Apr. 2001. The entire contents of these applications are incorporated herein by reference.

BACKGROUND OF THE INVENTION (1) Field of the Invention

The present invention relates to a novel drive configuration for skid steered vehicles, including tracked or wheeled vehicles, for example but not limited to, a military armoured tank.

A skid steered tracked vehicle is steered by forcing the two tracks to run at different speeds (skid steering). In the same way a wheeled skid steered vehicle is steered by forcing wheels to one side of the vehicle to run at different speeds to the wheels on the other side of the vehicle. For tracked vehicles, large driving force differences are required between the two tracks—large braking forces on the inner track and high driving forces on the outer track. This results in very high mechanical powers at individual track sprockets particularly when the vehicle is running at medium to high speeds. These high powers are sustained in a modern conventionally driven tracked vehicle by the use of mechanical power regeneration. Differential gears and cross-shafts are used to control the relative speeds of the tracks and transfer the braking power from the inner track to the outer track to sustain the turn. Similar considerations apply for skid steered wheeled vehicles.

A number of electric track drive arrangements use a separate electric motor to drive each track. This arrangement is commonly known as a two-line system. The regenerative steering power in such a system must be handled electrically resulting in the need for use of oversized motors and power converters. (For example the mechanical power measured at the outer track drive sprocket of a main battle tank, in a medium to high speed turn, can be around 2500 kW when the engine power is only approximately 1000 kW). An alternative approach uses the same mechanical regenerative arrangement as in a conventional transmission combined with an electric drive. This arrangement is sometimes referred to as a cross-shaft electric drive system and is illustrated in FIG. 1. U.S. Pat. No. 4,998,591 discloses an electric drive system of this layout.

In this arrangement, the steer cross-shaft runs across the vehicle outside the propulsion motor. This increases the size of the assembly and requires a number of idler gears. If a gear change is to be used, the propulsion cross-shaft must be separate from the motor shaft. This can be achieved by making the motor shaft hollow and passing the cross-shaft through. This however increases the diameter of the motor bearings making a high motor speed, desirable for good power density, difficult to achieve. The propulsion cross-shaft could be mounted outside the motor, or the motor mounted outside the propulsion cross shaft, increasing the package size and adding the need for idler gears increasing complexity and reducing efficiency.

(2) Description of the Art

U.S. Pat. No. 4,998,591 also discloses a drive configuration which uses a single differential mounted centrally and driven by a single propulsion motor. The differential is identical to a single differential in a conventional wheel driven car or truck axle. The torque from the drive motor is divided equally between the two half shafts which can rotate at different speeds relative to one another. On each half shaft is mounted a steer motor. To steer the vehicle, the inside steer motor must act as a brake and the outside steer motor must apply additional driving torque to generate the required large track drive force difference across the vehicle to cause the vehicle to skid steer. As the two steer motors are operating at the speed of the half shafts and are handling high torque when the vehicle is turning they are operating at high power, one regenerating and one driving. The system therefore, is not a mechanically regenerating system and has the same disadvantages as a two line system in that oversized motors are required.

U.S. Pat. No. 5,168,946 discloses a drive configuration similar to a conventional tank gearbox but does not use a steer cross-shaft. The disclosed arrangement uses three motors and a brake. For low speed operation, the brake is applied and a central motor is de-energised. The vehicle then drives as a two line system at low speeds. At higher speeds the brake is released and the central motor drives increasing the speed range and introducing mechanical regenerative steering through the central motor shaft. In order for this system to work as described in that document, the outer two motors would need large torque and power ratings giving little advantage over a purely two-line system as previously described.

U.S. Pat. No. 2,730,182 describes a controlled differential device. A French Patent FR 2,382,362 describes the operation of a controlled differential but does not appear to disclose a practical embodiment of such a device.

A controlled differential has the characteristics that it couples two half shafts and controls their relative speeds. When the steer motor is stationary the two half shafts are simply coupled by the controlled differential so that they must run at the same speed. When the steer motor is rotated in one direction one half shaft is forced to run faster than the other. When the steer motor is rotated in the other direction the other half shaft is forced to run faster than the other. Operation of the steer motor at whatever speed the vehicle is traveling will therefore cause the vehicle to turn, with steer powers regenerated across the vehicle by the torque produced in the cross-shafts, which supports the high track driving force difference between the inside and outside tracks.

U.S. Pat. No. 2,730,182 describes an arrangement using two long gears half meshing with each other and mounted on a common carrier, each meshing with an annular gear. Each annular gear is connected to a bevel gear which connects to the two half shafts. The steer motor acts through a worm and wheel on the carrier for the two long gears. Due to the use of bevel gears and the configuration for the two long meshing gears, such an arrangement would need to be large and heavy for a high power device.

The above described arrangements suffer from various disadvantages; including in some cases the need for over-rated motors to achieve steering, complex mechanical arrangements requiring multiple cross shafts and idler gears and/or complex motor configurations incorporating tubular shafts.

SUMMARY OF THE INVENTION

The present invention provides a novel drive configuration which seeks to alleviate at least some of the problems described for the prior art.

In accordance with the present invention there is provided a drive configuration for a skid steered vehicle comprising:

a pair of drive members for engaging with tracks or wheels of the skid steered vehicle, at least one propulsion motor having a single through motor shaft carrying the motor rotor and protruding from the ends of the motor, a first end of the motor shaft being coupled to one of the pair of drive members and a second end of the motor shaft being coupled to a controlled differential device, and a steer motor in driveable communication with the controlled differential device, the steer motor being controllable from a zero speed to give straight line running to one or more different speeds in either or both directions of rotation enabling steering of the vehicle in at least one direction.

Preferably a second propulsion motor is fitted on the other side of the vehicle between the controlled differential and the second track drive member. Alternatively, the arrangement may comprise a single propulsion motor, the second being replaced with a plain shaft or coupling between the controlled differential and the second drive member.

Preferably a transmission system is also used on each side of the vehicle between the outer end of each motor shaft and the drive member consisting of all or any combination of gear reductions brake and gear change or changes.

Desirably, the drive configuration may include a linkage for linking together gear changes and for braking in the transmission system on either side of the vehicle. Various suitable forms of linkage will no doubt occur to the skilled addressee. Linkages may be mechanical; electrical (eg wherein an electrical actuator is used to effect gear changes) or hydraulic (eg when a hydraulic actuator is used to effect gear changes), or of any other suitable form. The provision of a suitable linkage enables simultaneous gear change and/or breaking in the two sides of the transmission system and thereby provides better control in steering the vehicle.

The controlled differential device preferably comprises of two epicyclical gear trains. In a preferred option the planet carriers of the two epicyclical gear trains are common connected by a shaft running through the two sun gears. The steer motor acts on the two sun gears either through a short cross-shaft two sets of spur gears and a reverse idler gear, or by the use of bevel gears. The two output shafts from the controlled differential device; in this case connected to the propulsion motor shafts, are each coupled to the annuli of the epicyclical gear trains. This arrangement minimises the loads on the connections between the steering motor and the epicyclical gear train, but increases the speed of the planet gears. For cooling and lubrication it therefore may be desirable to consider other possible arrangements as listed below.

In a further possible arrangement, the output shafts are connected to the annuli, the steer motor acts on the planet carriers and the sun gears are common.

In a further possible arrangement the output shafts are connected to the sun gears, the annuli are common and the steer motor acts on the planet carriers.

In a further possible arrangement, the motor shafts are connected to the sun gears, the two planet carriers are common and the steer motor acts on the annuli.

In a further possible arrangement the output shafts are coupled to the planet carriers, the sun gears are common and the steer motor acts on the annuli.

In a further possible arrangement the output shafts are coupled to the planet carriers the annuli are common and the steer motor acts on the sun gears.

Other possibilities will no doubt occur to the skilled addressee without departure from the true scope of the invention as defined by the appended claims.

In one embodiment the novel drive configuration comprises two separate propulsion motors, gear reductions, brakes and gear change units, each one nominally driving one track or wheel as in a two-line system. A controlled differential steer unit is mounted between the two propulsion motors. A steer motor acting on the controlled differential then controls the relative speed of the two propulsion motors and so the relative speeds of the two tracks or wheels to impose the steer function. The motor shafts act as the propulsion cross-shaft and transfer the regenerative steering power.

This arrangement greatly simplifies the construction of the motors compared to a system that uses a tubular motor shaft. The gearing, brake and final drive are all easily mounted axially with no requirement to fit inside the run of a cross-shaft. The whole transmission including, gear reductions, gear changes and brakes can be fitted in a cylinder the diameter of the propulsion motors running across the width of the hull, apart from the relatively small steer motor, greatly reducing the volume used by the drive system in the vehicle.

An alternative embodiment may comprise a single propulsion motor. In this embodiment, for straight line running half of the power would be transferred through the steering differentials with a loss of efficiency. For packaging reasons small diameter motors are desirable. Two small diameter motors are preferred to one long small diameter motor, but both options are viable in the drive configuration of the invention.

The propulsion and steer motors are preferably electrical but one or both may optionally comprise a different type of motor, for example; a hydraulic motor.

A feature of this drive arrangement is the use of the controlled differential gear steer unit which causes the transmission of the regenerative steering powers directly through the motor shafts, removes the need for a separate steering cross-shaft and greatly simplifying the packaging and design of the other components.

DESCRIPTION OF THE FIGURES

For the purposes of exemplification, some embodiments of the invention will now be described with reference to the following Figures in which:

FIG. 4 shows a simplified embodiment of a drive configuration for a tracked vehicle in accordance with the invention;

FIG. 5 shows a further embodiment of a drive configuration for a tracked vehicle in accordance with the invention.

DESCRIPTION OF A PREFERRED EMBODIMENT

Figure 1:
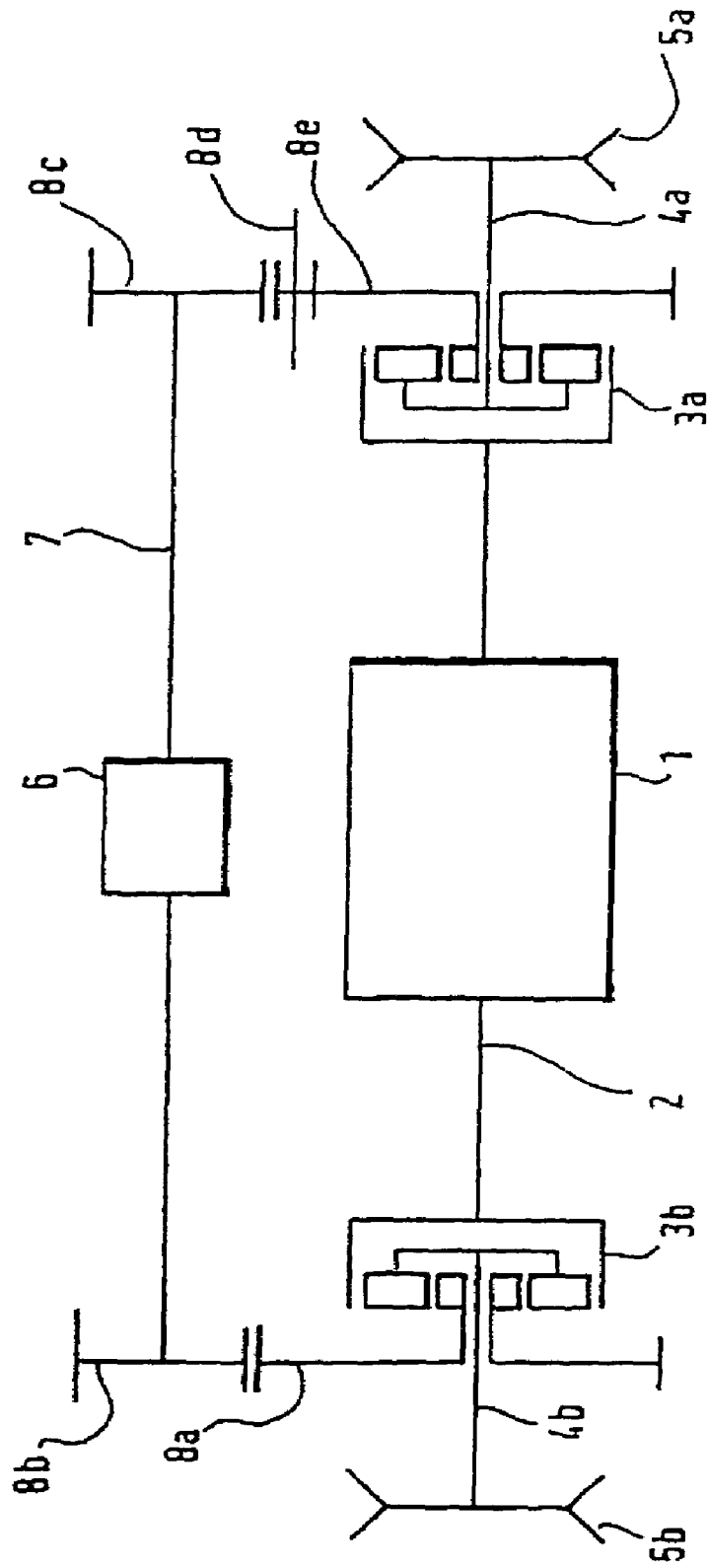
FIG. 1 shows a prior art drive configuration.

As can be seen from FIG. 1, the prior art drive configuration comprises a propulsion motor (1) mounted on a cross-shaft (2) which is coupled to the annuli of the two epicyclical steer differential (3a, 3b). The planet carriers of the two epicyclical steer differentials are connected to the output shafts (4a and 4b) and the track drive sprockets (5a and 5b). The steer motor (6) is mounted on a steer cross shaft (7). The steer cross shaft is coupled to the sun gears of the steer epicyclical differentials by a number of spur gears (8a, 8b, 8c, 8d, and 8e). An extra spur gear (8d) is used on one side to reverse the rotation of the sun gear. This layout is identical to that used in a conventional mechanical drive tank transmission, the propulsion motor is fitted in place of the gear range change pack and the hydraulic steer motor has been substituted for a electric motor. This is the basis of the electric drive shown in U.S. Pat. No. 4,998,591.

Figure 2:
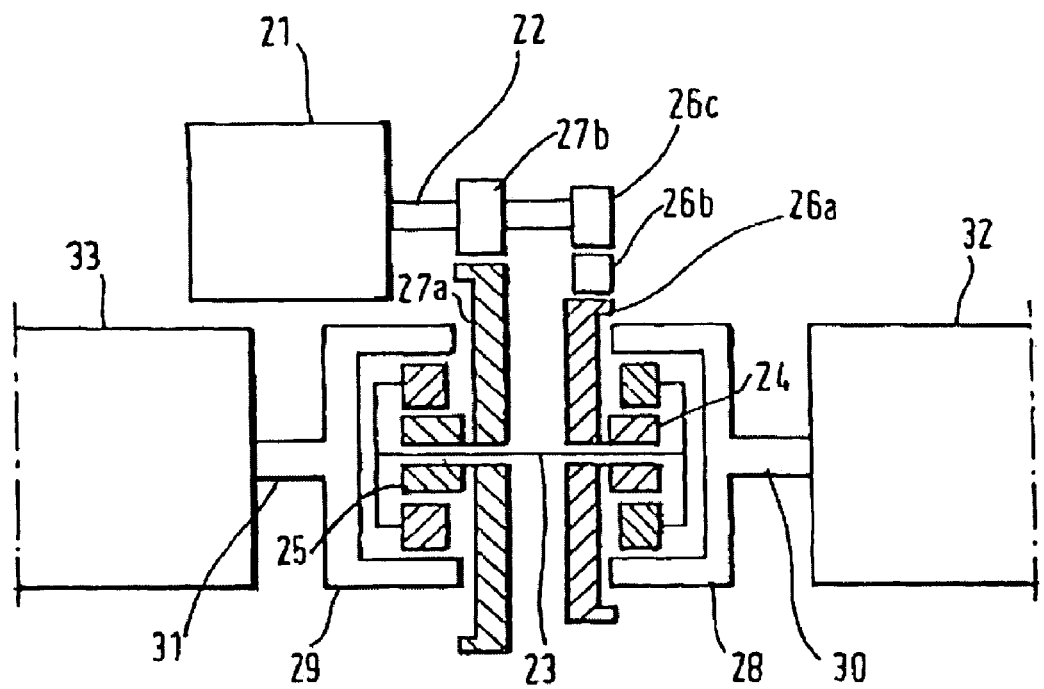
FIG. 2 shows a first controlled differential configuration suitable for use in an embodiment of the invention.

As can be seen from FIG. 2, a preferred arrangement of a controlled differential comprises a steer motor (21) mounted on a cross-shaft (22). A pair of epicyclical gear trains are arranged such that two planet carriers are connected by a shaft (23) which passes through the centre of two sun gears (24 and 25). The sun gears (24, 25) are in turn coupled with spur gears (26a, 26b, 26c, 27a, 27b) to the steering shaft. Idler gear (26b) is used on one side to reverse the direction of rotation of the sun gear. Two annuli (28, 29) of the epicyclical gear trains are coupled to output shafts (30, 31) of the controlled differential and are shown connected to two propulsion motors (32, 33).

Figure 3:
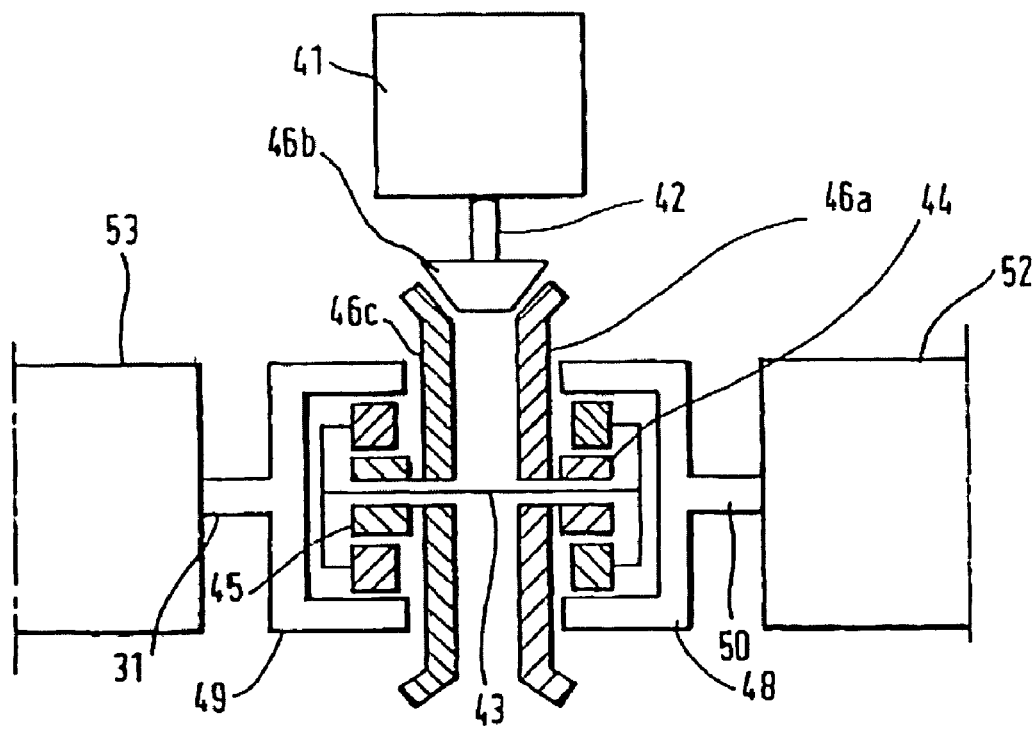
FIG. 3 shows a second controlled differential configuration suitable for use in an embodiment of the invention.

As can be seen in FIG. 3, a second controlled differential arrangement comprises a steer motor (41) including an output shaft (42). A pair of epicyclical gear trains are arranged such that two planet carriers are connected by a shaft (43) which passes through the centre of two sun gears (44 and 45). The sun gears (44, 45) are in turn coupled with bevel gears (46a, 46b, 46c) to the steering motor output shaft. The two annuli (48, 49) of the epicyclical gear trains are coupled to output shafts (50, 51) of the controlled differential and are shown connected to two propulsion motors (52, 53).

FIG. 4 illustrates, in general overview, a drive configuration for a tracked vehicle in accordance with the invention. The arrangement (comprises a steer motor (60) in driveable communication with a controlled differential (61). The controlled differential (61) couples the two motor shafts (62, 63) of the two propulsion motors (64 and 65). The rotors (67, 66) of the two motors are mounted on the motor shafts (62, 63). At the outer ends of each motor shaft is mounted a track drive sprocket (68, 69).

FIG. 5 illustrates a further embodiment of the invention for a tracked vehicle. A steer motor (71) is coupled to a controlled differential (72). The output of the controlled differential is connected to the two propulsion motors (74a, 74b) by motor shafts (73a, 73b). Between the outer ends of the motor shafts (73a, 73b) and the track drive sprockets (78a, 78b) are fitted a number of transmission components including gear reduction and gear change units (75a, 75b), brakes (76a, 76b) and final drive gear reductions (77a, 77b).

Figure 6:
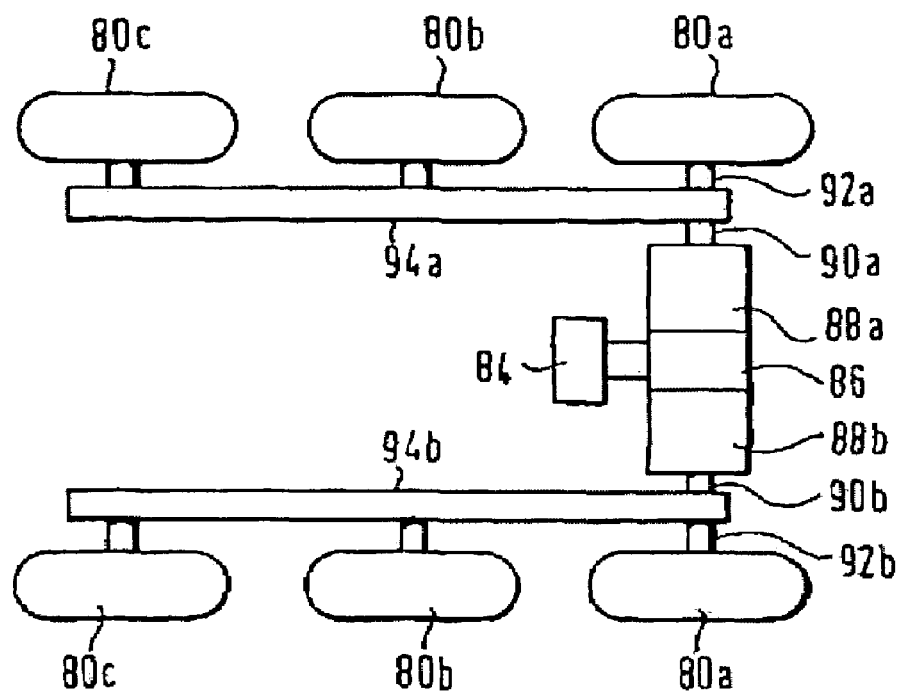
FIGS. 6 and 7 are schematic views of drive configurations for wheeled vehicles in accordance with the invention.

The embodiment illustrated in FIG. 6, is for a skid-steered wheeled vehicle. This embodiment comprises three pairs of wheels (80a), (80b) and (80c) spaced along the length of a vehicle hull. A steer motor (84) is coupled to a controlled differential (86) as described previously and the output of the controlled differential (86) is connected to two propulsion motors (88a), (88b) by shafts (90a), (90b). Between the ends of the outer ends of the shafts (90a), (90b) and the drive shafts (92a), (92b) of each wheel of the pair (80a) is fitted a transmission unit (94a), (94b). The transmission units link each of the wheels on one side of the hull.

Figure 7:
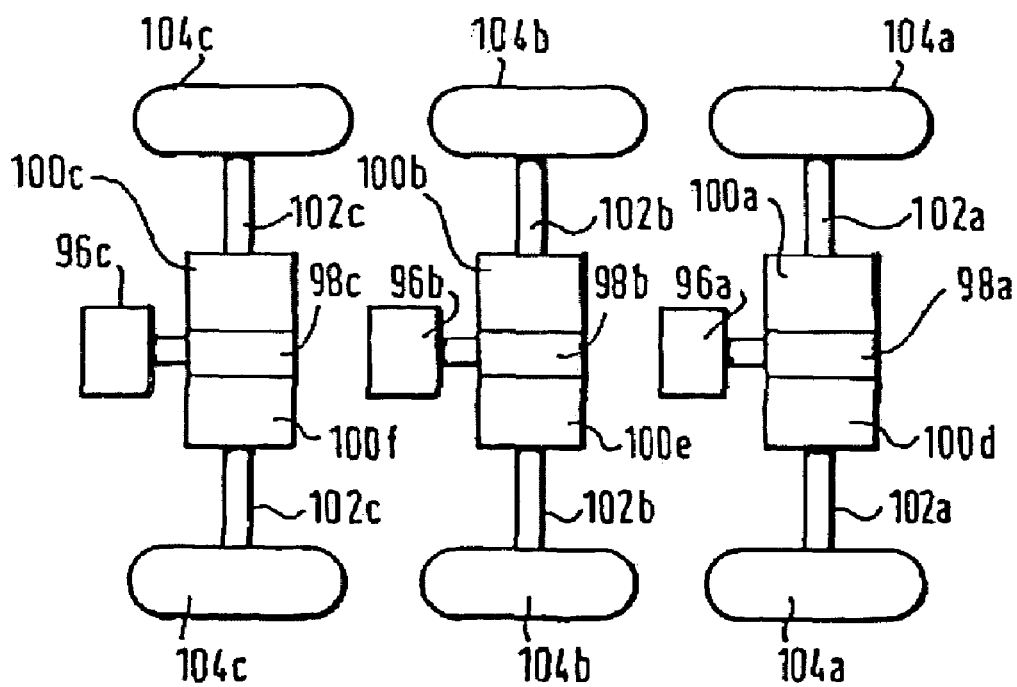

The embodiment illustrated in FIG. 7 is similar to that shown in FIG. 6 except that three steer motors (96a), (96b), (96c) and controlled differentials (98a), (98b) and (98c) are provided, each differential being connected to propulsion motors (100a), (100b), (100c), (100d), (100e) and (100f) connected to pairs of shafts (102a), (102b), (102c) to which the wheels pairs (104a), (104b), (104c) are connected.

The embodiments of the invention share the common feature of a controlled differential configured to cause a transmission of the regenerative steering powers through the propulsion motor shafts thereby removing the need for additional cross-shafts and greatly simplifying the packaging and design of the other components in the system. The novel arrangements take up less space than prior art configurations and are expected to be more mechanically efficient. Other embodiments of the invention will no doubt occur to the skilled addressee without departing from the true scope of the invention as claimed in the appended claims.

The invention claimed is:

1. A drive configuration for a skid steered vehicle comprising:
    a pair of drive members for engaging with a pair of tracks or wheels of the skid steered vehicle, at least one propulsion motor having a single through motor shaft carrying a rotor of the motor and protruding from the ends of the motor, a first end of the motor shaft being coupled to one of the pair of drive members and a second end of the motor shaft being coupled to an output of a controlled differential device, and a steer motor in driveable communication with an input of the controlled differential device, the steer motor being controllable from a zero speed to give straight line running to one or more different speeds in either or both directions of rotation enabling steering of the vehicle in at least one direction.

2. A drive configuration as claimed in claim 1 wherein there is only a single propulsion motor, and a plain shaft or coupling is provided between the controlled differential and the second drive member.

3. A drive configuration as claimed in claim 1 wherein there are at least two propulsion motors.

4. A drive configuration as claimed in claim 1 wherein the configuration is further provided with a transmission system comprising one or more of a pair of brakes, a pair of gear reduction/change units and a pair of final drive units each mounted symmetrically of the controlled differential.

5. A drive configuration as claimed in claim 4 wherein the paired components of the transmission are linked by a linkage mechanism configured to provide substantially simultaneous gear changes and/or braking at the two sides of the vehicle.

6. A drive configuration as claimed in claim 5 wherein the linkage mechanism is mechanical, electrical or hydraulic.

7. A skid steered vehicle incorporating the drive configuration as claimed in claim 1.

8. A skid steered vehicle as claimed in claim 7 wherein the vehicle is a tracked or wheeled vehicle.

9. A drive configuration for a skid steered vehicle comprising:
    first and second drive members for engaging with respective tracks or wheels at opposite sides of the vehicle;
    a first propulsion motor disposed inboard of the first drive member and arranged to drive a first shaft coaxial with a rotor of such motor;
    a second propulsion motor disposed inboard of the second drive member and arranged to drive a second shaft coaxial with a rotor of such motor;

a controlled differential device disposed between the first and second propulsion motors; and a steer motor coupled to the controlled differential device to provide steering input to the configuration through the controlled differential device, the first shaft being coupled at one end to drive the first drive member and coupled at its other end to a first output of the controlled differential device and the second shaft being coupled at one end to drive the second drive member and coupled at its other end to a second output of the controlled differential device.

10. A drive configuration as claimed in claim 9 wherein the controlled differential device comprises a pair of epicyclical gear trains.

11. A drive configuration as claimed in claim 10 wherein the epicyclical gear trains are arranged to form a double epicyclical controlled differential having a common planet carrier.

12. A drive configuration as claimed in claim 11 wherein the planet carriers are joined by a common shaft passing through a pair of sun gears.

13. A drive configuration as claimed in claim 9 wherein the drive configuration is housed in a cylinder of a diameter approximately equal to that of the propulsion motors with the steer motor located adjacent and outside the cylinder.

14. A drive configuration as claimed in claim 13 wherein the cylinder extends across the width of the hull of the vehicle.

15. A drive configuration as claimed in claim 9 wherein one or more of the propulsion motor(s) and/or steer motor is electrically or hydraulically driven.

16. A skid steered vehicle incorporating the drive configuration as claimed in claim 9.

17. A drive configuration as claimed in claim 9 wherein the controlled differential device comprises a pair of epicyclical gear trains each comprising a sun gear, planet gears carried by a planet carrier, and an annulus; the planet carriers being interconnected so as to rotate in common; and wherein said first and second shafts are coupled to the controlled differential device trough respective said annuli.

18. A drive configuration for a skid steered vehicle comprising:

first and second drive members for engaging with respective tracks or wheels at opposite sides of the vehicle:

a controlled differential device comprising a pair of epicyclical gear trains each comprising a sun gear, planet gears carried by a planet carrier, and an annulus; the planet carriers being interconnected by a shaft passing through the sun gears such that the planet carriers rotate in common;

first and second propulsion motors each coupled between a respective sold drive member and a respective said annulus; and a steer motor coupled to impart relative rotation between said sun gears in opposite directions.

19. A drive configuration as claimed in claim 18 wherein said sun gears are coupled to said steer motor through respective spur gear trains, one such train comprising a gear to reverse the direction of rotation of the respective sun gear in relation to the other sun gear.

20. A drive configuration as claimed in claim 18 wherein said sun gears are coupled to said steer motors through respective bevel gears coupled to a common bevel gear.

21. A skid steered vehicle incorporating the drive configuration as claimed in claim 18.

* * * * *

UNITED STATES PATENT AND TRADEMARK OFFICE
CERTIFICATE OF CORRECTION

| | |
|---|---|
| PATENT NO. | : 7,074,151 B2 |
| APPLICATION NO. | : 10/474349 |
| DATED | : July 11, 2006 |
| INVENTOR(S) | : Robert W. Thompson |

Page 1 of 1

It is certified that error appears in the above-identified patent and that said Letters Patent is hereby corrected as shown below:

Title Page
Line 7 of the Abstract (57) delete "steep" and replace with -- steer --.

At column 5, line 1, delete "differential" and replace with -- differentials --.

At column 8, line 5, delete "trough" and replace with -- through --.

At column 8, line 18, delete "sold" and replace with -- said --.

Signed and Sealed this

Twenty-third Day of January, 2007

JON W. DUDAS
*Director of the United States Patent and Trademark Office*